United States Patent [19]

Uchida et al.

[11] Patent Number: 5,191,577

[45] Date of Patent: Mar. 2, 1993

[54] SWITCH STAGE NUMBER SETTING APPARATUS FOR MSSR CHANNELS

[75] Inventors: Yoshihiro Uchida; Shurji Yoshimura, both of Kawasaki; Yasuhiro Aso, Tokyo; Masami Murayama, Yokohama, all of Japan

[73] Assignee: Fujitsu Limited, Japan

[21] Appl. No.: 748,758

[22] Filed: Aug. 20, 1991

[30] Foreign Application Priority Data

Aug. 20, 1990 [JP] Japan .................................. 2-217101

[51] Int. Cl.$^5$ ................................................ H04J 3/02
[52] U.S. Cl. ...................................... 370/60; 370/68.1; 370/92; 370/94.1
[58] Field of Search ................... 370/60, 68.1, 91, 92, 370/94.1

[56] References Cited

U.S. PATENT DOCUMENTS 4,201,891  5/1980  Lawrence et al. ................ 370/91 X
4,651,318  3/1987  Luderer ............................. 370/60 X Primary Examiner—Douglas W. Olms
Assistant Examiner—Russell W. Blum
Attorney, Agent, or Firm—Staas & Halsey

[57] ABSTRACT

Recognizers are provided in respective self-routing modules in respective stages of a channel operating according to a multi-stage self-routing method. A recognizer sets a stage number to the switches in the self-routing module of the stage it belongs to by recognizing a stage number setting signal supplied from a self-routing module in the preceding stage. Updaters are provided in respective self-routing modules. An updater updates a stage number setting signal supplied from a self-routing module in the preceding stage and outputs it to a self-routing module in the succeeding stage. A stage number setter is provided in a virtual channel controller connected before a channel. It outputs predetermined stage number setting signals to a self-routing module in the first stage of a channel. Stage numbers specified by the stage number setting signals are autonomously set when the stage number setting signals sequentially pass through self-routing modules in respective stages.

12 Claims, 14 Drawing Sheets

SRM 7 : SELF-ROUTING MODULE 7
ST0, ST1 : STAGE NUMBER SETTING SIGNAL

SRM 7 : SELF-ROUTING MODULE 7
ST0, ST1 : STAGE NUMBER SETTING SIGNAL

SWITCH STAGE NUMBER SETTING APPARATUS FOR MSSR CHANNELS

BACKGROUND OF THE INVENTION

1. Field of the Invention

This invention pertains to a digital switching system and more particularly to an apparatus for setting the stage number of ATM (Asynchronous Transfer Mode) channels, according to a multi-stage self-routing method, to integrally switch information having different traffic characteristics, such as moving images, numerical data and voices, by using an ATM transmission system like a broadband ISDN.

2. Description of the Related Art

With the widespread use of data communication, public switched networks are now required to execute high-quality data communication, as well as the traditional voice communication.

A Broadband Integrated Services Digital Network (B-ISDN) has begun to be utilized as a communication network, not only for low-speed data, such as voice data, but also for high-speed data between 150 Mbps and 600 Mbps, such as moving images, and various interfaces have begun to be standardized. CCITT (International Telegraph and Telephone Consultative Committee) is currently working on its advisory report on an ATM transmission system, which is an essential technology for realizing a B-ISDN, to be submitted in 1992.

An ATM communication network transmits and exchanges information of different bands divided and housed in fixed-length data units called cells, to which headers are added. A header contains a virtual channel identifier (VCI) for identifying the receiving side subscriber. Thus, an ATM switching system uses the headers to enable hardware to transfer and switch cells to the receiving side subscriber at high speed. This makes it possible to flexibly provide services requiring different transmission speeds, and to efficiently utilize transmission paths.

In this switching operation, a switching system processor designates the buffer the switches of the ATM switching system to which cells are to be written according to the VCI attached to a cell, utilizing. The cells flow autonomously in the network according to this designation. Hence, this switching operation is called a self-routing (SR). The receiving side subscriber extracts necessary cells flowing over ATM highways based on the VCIs attached to cells, and restores user information by eliminating headers from the cells.

FIG. 1 is a schematic view of a generic ATM switching system.

In FIG. 1, a plurality of trunks 2 accommodate respective subscriber lines 1 on the input side. A plurality of multiplexers (MUXs) 3 partially multiplex respective outputs from the input trunks 2. #1 through #4 of input highways 4 receive outputs from the corresponding multiplexers 3. A virtual channel controller (VCC) 5 accommodates the input highways 4. Based on the call control information inputted from a central processor (CC) 13 of the switching system through a controller interface (CPIF) 12, the VCC 5 exchanges the VCIs (information specifying the destination) attached to the headers of the received cells from the respective input highways 4, with new VCIs specifying the next output node (ATM exchanger). At the same time, the VCC 5 adds to the head ends of the cells information specifying the path over which the cells are to be switched to be outputted to destined output highways 8 in a data format called tags. This will be described later.

A multi-stage self-routing channel (MSSR) 6, a virtual channel, receives respective outputs from the VCC 5. The MSSR 6 comprises a plurality of self-routing modules (SRMs) 7. In the example shown in FIG. 1, the MSSR 6 has a $2 \times 3$ configuration in which two (2) rows and three (3) stages of SRMs 7 are provided. The SRMs 7 in the first stage are #$1_1$ and #$1_2$, those in the second stage are #$2_1$ and #$2_2$, and those in the third stage are #$3_1$ and #$3_2$. The configuration of the SRMs 7 are further elaborated later.

The MSSR 6 outputs cells to #1 through #4 of the output highways 8, which are connected to respective demultiplexers (DMUXs) 9, which demultiplex the cells and output the demultiplexed cells to subscriber lines 11 on the output side through output trunks 10 corresponding to the respective DMUXs 9.

FIG. 1 shows a configuration where cells flow in a single direction over the channels. It goes without saying that channels for cells flowing in the opposite directions can be configured similarly.

FIG. 2 shows an exemplary configuration of one of the SRMs 7 shown in FIG. 1.

In the example shown in FIG. 2, an SRM 7 has two (2) input lines and two (2) output lines, and switches $SW1_1$, $SW1_2$, $SW2_1$ and $SW2_2$ are provided at the four (4) crossing points of the input lines and output lines. That is, the four (4) switches of an SRM 7 correspond with two (2) input lines and two (2) output lines. Although an actual channel comprises more input lines and more output lines in reality, since their basic connections are entirely similar to those in the example shown in FIG. 2, the SRMs 7 are explained by referring to the $2 \times 2$ exemplary configuration having two (2) input lines and two (2) output lines.

FIG. 3 shows the configuration of one of the above switches $SW1_1$ through $SW2_2$.

In FIG. 3, by identifying the (later described) tags of supplied ATM cells, a header checker 14 judges whether or not the switch should accept the ATM cells. When the header checker 14 decides to accept the ATM cells, a cell buffer 15 of the switch stores the ATM cells. A multiplexer 16 of the switch multiplexes the ATM cells thus stored at a cell timing for output over an highway on the output side, thereby completing the switching operation. When the header checker 14 does not decide to accept the ATM cells, they are sent to the next switch over a line branching before the header checker 14.

Next, FIGS. 4A and 4B show the data configuration of the ATM cells handled by the ATM switching system shown in FIG. 1.

An ATM cell normally has the following data. As shown in FIG. 4A, an ATM cell has an information part 18, with e.g. forty-eight (48) octets, for storing communication information. An ATM cell also has a header part 17, with e.g. five (5) octets, for storing a VCI or a VPI (the address information for the receiving side subscriber), a CRC code for error correction, information specifying the payload type of the cell, and information indicating whether or not the cell should be abandoned during a congestion. An ATM cell also has a tag part 19, with e.g. one (1) octet for storing information of the path in the MSSR 6 over which the ATM cell should be routed to, be outputted to the destined one of the output highways 8. The VCC 5 shown in FIG. 1 attaches the tag part 19 to the ATM cells it receives.

FIG. 4B shows the configuration of the tag part 19 shown in FIG. 4A.

A tag information part 19 has three (3) stages of two (2) bit tag data 20 for having the respective switches $SW1_1$ through $SW2_2$ (see FIG. 2.) in each of the three (3) stage SRMs 7 #$1_1$ through #$3_2$ select ATM cells.

FIG. 5 shows a relation between tag data and a transmission path.

FIG. 6 shows an exemplary configuration of tag data.

The examples shown in FIGS. 5 and 6 are referred to in explaining how the MSSR 6 selects a path for transmitting ATM cells according to tag data 20.

FIG. 1 shows an example where #$1_1$ through #$3_2$ of the SRMs 7 in the MSSR 6 are pair-connected in three (3) stages. FIG. 2 shows an example, where respective SRMs 7 have the four (4) switches $SW1_1$ through $SW2_2$. FIG. 5 shows the relations among all of the six (6) SRMs 7 #$1_1$ through #$3_2$.

Here, the header checker 14 (see to FIG. 3.) in each of the four (4) switches $SW1_1$ through $SW2_2$ respectively in #$1_1$ and #$1_2$ of the SRMs 7 in the first stage refers to the first stage two (2) bit tag data 20 (Refer to FIG. 4B.) in the tag part 19 attached to the supplied ATM cells. If the value of the tag data 20 is 1 ("01" in binary expression), switches $SW1_1$ and $SW1_2$ in #$1_1$ and #$1_2$ of the first stage SRMs 7 have respective cell buffers 15 (Refer to FIG. 3.) receive ATM cells. If the value of the tag data 20 is 2 ("10" in binary expression), switches $SW2_1$ and $SW2_2$ in #$1_1$ and #$1_2$ of the first stage SRMs 7 have respective cell buffers 15 (Refer to FIG. 3.) receive ATM cells.

The header checker 14 in each of the four (4) switches $SW1_1$ through $SW2_2$ in the respective ones of the second stage SRMs 7 #$2_1$ and #$2_2$ refers to the second stage two (2) bit tag data 20 in the tag part 19 attached to the supplied ATM cells. Similarly to the above case of the first stage, either pair of switches $SW1_1$ and $SW1_2$ or $SW2_1$ and switches $SW2_2$ in #$2_1$ and #$2_2$ of the second stage SRMs 7 buffer the ATM cells.

The header checker 14 in each of the four (4) switches $SW1_1$ through $SW2_2$ in the respective ones of the third stage SRMs 7 #$3_1$ and #$3_2$ refers to the second stage two (2) bit tag data 20 in the tag part 19 attached to the supplied ATM cells. Similarly to the above cases of the first and second stages, either pair of switches $SW1_1$ and $SW1_2$ or switches $SW2_1$ and $SW2_2$ in #$3_1$ and #$3_2$ of the third stage SRMs 7 buffer the ATM cells.

The above explanation describes a case in which the respective SRMs 7 comprise four (4) switches $SW1_1$ through $SW2_2$. Here, for example, #1 of the input highways 4 can select either switch $SW1_1$ or switch $SW2_1$ in #$1_1$ of SRMs 7. However, in an actual switching system, respective SRMs 7 comprise sixteen (16) switches in response to four (4) input lines and four (4) output lines, and an input highway can select one of four (4) switches $SW1_1$ through $SW2_2$. As shown in FIG. 4B, it is possible to select one from them using two (2) bit tag data 20 in respective stages.

Assume now that the tag data 20 attached to tag part 19 of an ATM cell inputted from #1 of the input highways 4 shown in FIG. 5 is as shown in FIG. 6. In this case, the ATM cells are transmitted over the path shown as a kinked bold line shown in FIG. 5.

That is, an ATM cell inputted from #1 of the input highways 4 is supplied to switches $SW1_1$ and $SW2_1$ in #$1_1$ of the SRMs 7, as shown in FIG. 5. Here, assume also that a register (not shown in FIG. 5) in the header checker 14 in the respective switches is provided with information that the switches $SW1_1$ and $SW2_1$ are set in #$1_1$ of the first stage SRMs 7. Thus, the respective header checkers 14 in switches $SW1_1$ and $SW2_1$ in #$1_1$ of SRMs 7 recognize the value "01" (Refer to FIG. 6.) of the two (2) bit tag data 20 in the first stage of the tag part 19 of the supplied ATM cell. This causes the cell buffer 15 (FIG. 3) of only $SW1_1$ to receive the supplied ATM cell. The corresponding one of the multiplexers (MUXs) 16 (FIG. 3) multiplexes the ATM cell stored in the cell buffer 15 at a predetermined cell timing over the output highway towards switch $SW1_2$.

The ATM cell thus multiplexed is supplied to switches $SW1_1$ and $SW2_1$ in #$2_1$ of the second stage SRMs 7 through the multiplexer 16 (FIG. 3) in switch $SW1_2$ in #$1_1$ of the SRMs 7. Here, it is assumed that a register (not shown in FIG. 5) in the header checker 14 in the respective switches is provided with information that the switches $SW1_1$ and $SW2_1$ are set in #$2_1$ of the second stage SRMs 7. Thus, the respective header checkers 14 in switches $SW1_1$ and $SW2_1$ in #$2_1$ of the second stage SRMs 7 recognize the value "10" (Refer to FIG. 6.) of the two (2) bit tag data 20 of the tag part 19 of the supplied ATM cell. This causes the cell buffer 15 (FIG. 3) of only $SW2_1$ to receive the supplied ATM cell. The corresponding one of the multiplexers (MUXs) 16 (FIG. 3) multiplexes the ATM cell stored in the cell buffer 15 at a predetermined cell timing over the output highway towards switch $SW2_2$.

The ATM cell thus multiplexed is supplied to switches $SW1_1$ and $SW2_2$ in #$3_2$ of the third stage SRMs 7 through the multiplexer 16 (FIG. 3) in switch $SW2_2$ in #$2_1$ of the SRMs 7. Here, it is assumed that a register (not shown in FIG. 5) in the header checker 14 in the respective switches is provided with information that the switches $SW1_1$ and $SW2_2$ are set in #$3_2$ of the third stage SRMs 7. Thus, the respective header checkers 14 in switches $SW1_1$ and $SW2_2$ in #$3_2$ of the third stage SRMs 7 recognize the value "10" (Refer to FIG. 6.) of the two (2) bit tag data 20 of the tag part 19 of the supplied ATM cell. This causes the cell buffer 15 (FIG. 3) of only $SW2_1$ to receive the supplied ATM cell. The corresponding one of the multiplexers (MUXs) 16 (FIG. 3) multiplexes the ATM cell stored in the cell buffer 15 at a predetermined cell timing over #4 of the output highways 8 to be outputted from the switching system.

As described above, switches $SW1_1$ through $SW2_2$ in the respective stage SRMs 7 of the MSSR 6 recognize the tag part 19 at different bit positions (Refer to FIG. 4B.) in the tag data 20. Therefore, each of the SRMs 7 needs to have a stage number indicating its module stage.

FIG. 7 shows a first prior art configuration for setting stage numbers to the respective SRMs 7 shown in FIG. 1.

In the first prior art configuration, the stage numbers of the SRMs 7 is determined in a hardware manner e.g. by two kinds of stage number setting signals ST0 and ST1 supplied from a stage number setter 21 in each of the SRMs 7 as fixed voltages. That is, when the stage number is set to 1, for example, the stage number setter 21 outputs a high level voltage and a low level voltage, respectively, as stage number setting signals ST0 and ST1. The stage number setter 21 generates stage number setting signal ST0 having a positive voltage supplied through a resistor R from a power source $V_{CC}$ and stage number setting signal ST1 having the earth voltage. Stage number setting signals ST0 and ST1 thus obtained set stage numbers to registers (not shown) in the header checkers 14 respectively in four (4) switches $SW1_1$ through $SW2_2$ (FIG. 2) in the SRM 7 to which the stage number setter 21 belongs. Thence, the earlier described switching operations are performed.

FIG. 8 shows a second prior art configuration for setting stage numbers in the respective SRMs 7 shown in FIG. 1.

In the second prior art configuration, two kinds of stage number setting signals ST0 and ST1 supplied from a stage number setter 22 in each of the SRMs 7 determine the stage numbers of the SRMs 7. In this case, two dip switches S in the stage setter 22 change stage number setting signals ST0 and ST1 for respective SRMs 7. That is, when the stage number is set to 1, for example, the stage number setter 22 has dip switches S to be turned off for stage number setting signal ST0 and on for stage number setting signal ST1. The stage number setter 22 generates stage number setting signal ST0 having a positive voltage supplied through a resistor R from a power source $V_{CC}$ and stage number setting signal ST1 having the earth voltage. Stage number setting signals ST0 and ST1 thus obtained set stage numbers to registers (not shown) in the header checkers 14 respectively in four (4) switches $SW1_1$ through $SW2_2$ (FIG. 2) in the SRM 7 to which the stage number setter 22 belongs. Thence, the earlier described switching operations are performed, as with the first prior art configuration.

However, the first prior art configuration shown in FIG. 7 causes the stage number setters 21 in respective stages to be configured differently, although basically the six (6) SRMs 7 in the three (3) stages have scant functional differences. Since a hardware combination for a particular stage cannot be used for another, the first prior art configuration has a problem that parts for the SRMs cannot be commonly designed, thereby preventing SRM 7 in a stage from being applied to another stage and thus lacking in flexibility.

On the other hand, the second prior art configuration shown in FIG. 8 has dip switches S in stage number setter 22 freely change stage numbers of the respective SRMs 7, thereby enabling SRM 7 in a stage to be used in another stage. However, when a stage number is set incorrectly, respective switches in the SRM 7 recognize incorrect bit positions of the tag data 20. (Refer to FIG. 4B.) Therefore, the second prior art configuration has the problem that the MSSR 6 as a whole might cause a severe fault, such as discarding ATM cells and outputting ATM cells to wrong output highways. The higher the number of the SRMs in an MSSR, the more likely such an occurrence is.

SUMMARY OF THE INVENTION

This invention is conceived based on the above background, and aims at making self-routing modules interchangeable with those in other stages and at securing setting stage numbers in the respective stages of the self-routing modules.

It is premised on a switch stage number setter for setting stage numbers, which identify the stages, to self-routing modules in respective stages of a channel operating according to the multi-stage self-routing module method.

Operation based on a first principle of this invention is as follows.

Recognizers are provided in respective self-routing modules. A recognizer sets a stage number to the switches in the self-routing module of the stage it belongs to by recognizing a stage number setting signal supplied from a self-routing module in the preceding stage.

Updaters are provided in respective self-routing modules. An updater updates a stage number setting signal supplied from a self-routing module in the preceding stage and outputs it to a self-routing module in the succeeding stage.

The stage number setter is provided in a virtual channel controller connected before a channel. It outputs predetermined stage number setting signals.

The first principle of this invention as described above enables stage numbers to be assigned securely to self-routing modules in respective stages, because stage numbers specified by the stage number setting signals are autonomously set when the stage number setting signals sequentially pass through self-routing modules in respective stages, as long as transmission paths among self-routing modules are connected correctly.

Operation based on a second principle of this invention is as follows.

Receivers are provided in respective self-routing modules. A receiver receives and switches a cell having stage number setting information supplied from a self-routing module in the preceding stage. It recognizes the stage number setting information attached to the cell and sets the stage number in switches of the self-routing module to which it belongs. The stage number setting information is attached e.g. to the tag part of a cell.

Updaters are provided in respective self-routing modules. An updater updates the stage number setting information of a cell received at a receiver and reattaches the updated stage number setting information to the cell, which it outputs to a self-routing module in the succeeding stage.

A cell emitter is provided in the virtual channel controller connected before a channel. It outputs a cell having predetermined stage number setting information.

The second principle of this invention as described above has an advantage that no special transmission line is required for transmitting stage number setting information. It also has the advantage gained by the first embodiment of this invention, because stage numbers are specified by the stage number setting information attached to a cell transmitted over ordinary transmission paths connecting self-routing modules.

In particular, when the cell emitter is provided in a virtual channel controller and stage number setting information is attached to the tag part of a cell, stage numbers can be set efficiently with little modification to conventional hardware.

The first and second principles of this invention enable self-routing modules to be interchanged among different stages and to have appropriate stage numbers securely assigned to them.

BRIEF DESCRIPTION OF THE DRAWINGS

Those in the same field can easily understand additional purposes and features of this invention from the descriptions of the principles and the preferred embodiments of this invention together with the attached drawings. In the drawings.

DESCRIPTION OF THE PREFERRED EMBODIMENTS

Explanation of the Principles

Figure 9A:
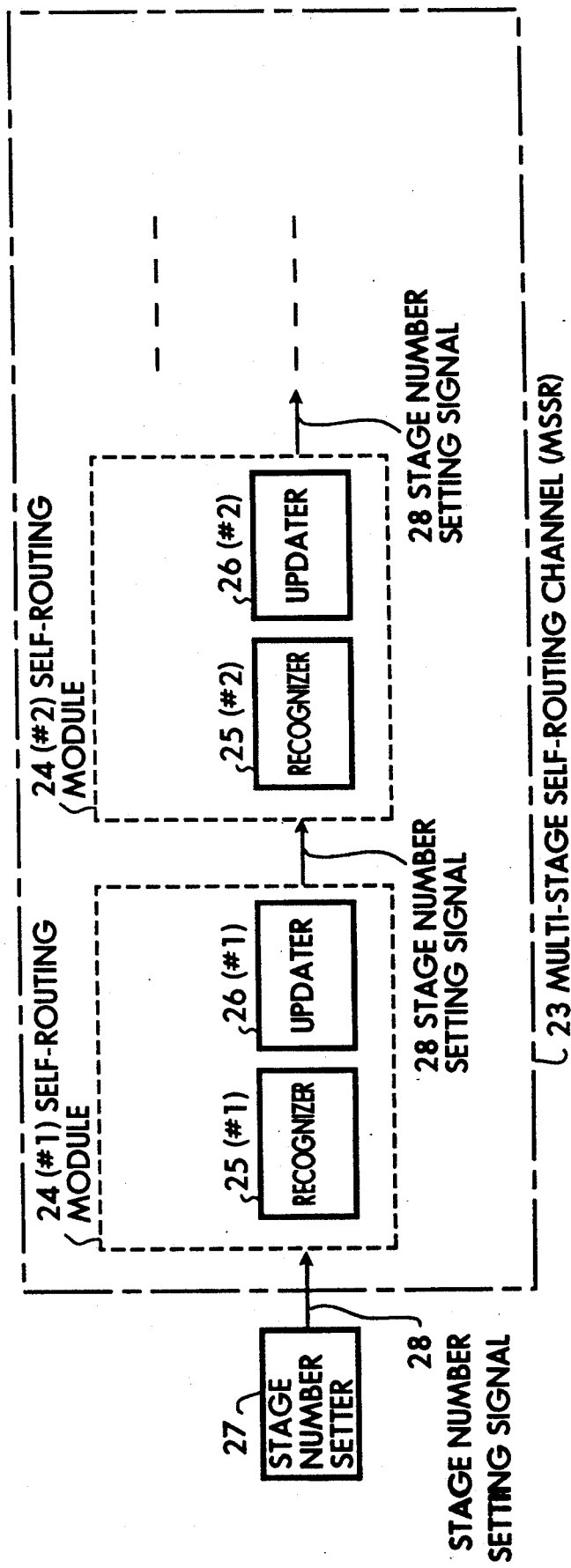
FIG. 9A is a schematic view for explaining a first principle of this invention.
Figure 9B:
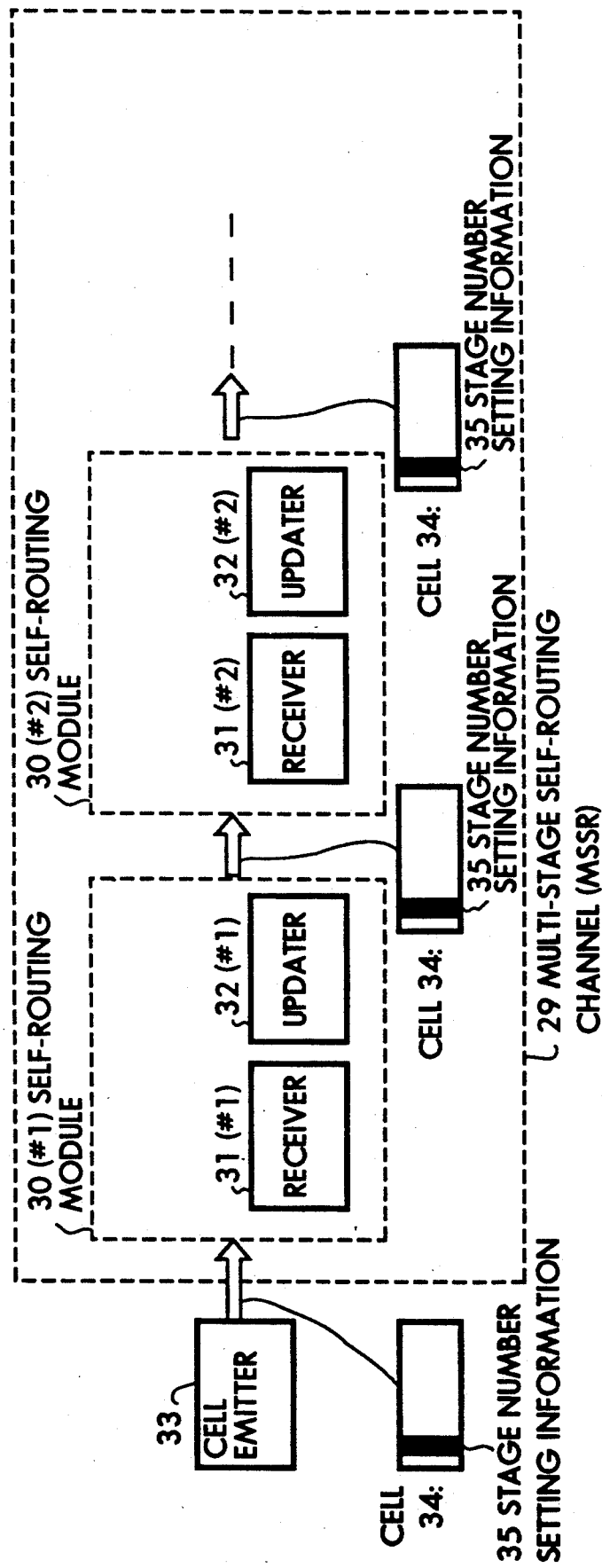
FIG. 9B is a schematic view for explaining a second principle of this invention.

Before describing the preferred embodiments of this invention, its principles are explained by referring to FIGS. 9A and 9B.

FIG. 9A is a schematic view for explaining a first principle of this invention.

Recognizers 25 are provided in respective self-routing modules 24. A recognizer 25 sets a stage number e.g. through registers to the switches (not shown) in the self-routing module 24 of the stage it belongs to by recognizing a stage number setting signal 28 supplied from a self-routing module 24 in the preceding stage.

Updaters 26 are provided in respective self-routing modules 24. An updater 26 updates a stage number setting signal supplied from a self-routing module 24 in the preceding stage and outputs it to a self-routing module 24 in the succeeding stage.

A stage number setter 27 outputs predetermined stage number setting signals 28 to a first stage of a self-routing module 24 (#1) in a multi-stage self-routing channel 23. The stage number setting signals 28 are signals capable of counting the value of stage numbers of the self-routing modules 24 in the multi-stage self-routing channel 23.

The stage number setter 27 outputs as the stage number setting signals 28 signals capable of expressing the value corresponding to the stage number of the self-routing module 24 (#1) in the first stage of the multi-stage self-routing channel 23.

The stage number setter 27 is provided e.g. in a virtual channel controller (VCC) connected before a multi-stage self-routing channel 23. The updaters 26 provided in respective self-routing modules 24 output to a self-routing module 24 in the succeeding stage predetermined stage number setting signals 28 expressing the values incremented by +1 to the values expressed by stage number setting signals 28 supplied from a self-routing module 24 in the preceding stage.

Stage number setting signals 28 are transmitted between the stage number setter 27 and the self-routing module 24 in the first stage or among different self-routing modules 24 e.g. over unused links of asynchronous transfer mode transmission paths.

When an asynchronous transfer mode transmission path comprises multiple stages of self-routing modules 24, the stage number setter 27 is connected to the recognizer 25 and the updater 26 of the self-routing module 24 (#1) in the first stage, and the recognizers 25 and the updaters 26 in the subsequent stages are sequentially connected to each other. After the connections are completed, the stage number setting signals outputted from the stage number setter 27 are outputted to the succeeding stage after being sequentially updated by the updaters 26 in the self-routing modules 24 in the respective stages. The recognizers 25 in the self-routing modules 24 in the respective stages recognize the stage number setting signals 28 thus transmitted. Thus, the configuration shown in FIG. 9A, which illustrates the first principle of this invention, enables stage numbers specified by the stage number setting signals 28 to be assigned autonomously, as the stage number setting signals 28 sequentially pass through self-routing modules 24 in respective stages. Therefore, the stage number setting signals 28 securely assign stage numbers to self-routing modules 24 in respective stages, as long as transmission paths are set correctly among the self-routing modules 24.

FIG. 9B is a schematic view for explaining a second principle of this invention.

Receivers 31 are provided in respective self-routing modules 30. A receiver 31 receives and switches a cell 34 having stage number setting information 35 supplied from a self-routing module 30 in the preceding stage. It recognizes the stage number setting information 35 attached to the cell 34 and sets the stage number e.g. to registers (not shown) in switches of the self-routing module 30 to which it belongs.

Updaters 32 are provided in respective self-routing modules 30. An updater 32 updates the stage number setting information 35 of the cell 34 received at a receiver 31 and reattaches the updated stage number setting information 35 to the cell 34, which it outputs to a self-routing module 30 in the succeeding stage.

A cell emitter 33 outputs the cell 34 having predetermined stage number setting information 35, which comprises data capable of expressing values corresponding to the stage number of the self-routing module 30 (#1) in the first stage of the multi-stage self-routing module 30 in the multi-stage self-routing channel 29. In this case, the cell emitter 33 is provided in the virtual channel controller (VCC) connected before the multi-stage self-routing channel 29, and the stage number setting information 35 is attached to the tag part of the cell 34 outputted from the cell emitter 33. The updaters 32 provided in the respective self-routing modules 30 replace the current stage number setting information 35 attached to the cell 34 with new stage number setting information 35, when the cell 34 is outputted to the self-routing module 30 in the succeeding stage. The new stage number setting information 35 expresses the value set in the current stage number setting information 35 attached to the cell 34 received at the receiver 31 incremented by +1.

In the configuration shown in FIG. 9B, which illustrates the second principle of this invention, as in FIG. 9A, the stage numbers are autonomously assigned to respective stages, as the cell 34 sequentially passes through respective stages of self-routing modules 30. The stage numbers are specified by the stage number setting information 35 attached to cell 34 transmitted over ordinary asynchronous transfer mode transmission paths connecting self-routing modules 30. Therefore, no special transmission line is required for transmitting stage number setting information.

In particular, when the cell emitter 33 is provided in a virtual channel controller (VCC) and stage number setting information 35 is attached to the tag part 19 of the cell 34, stage numbers can be set efficiently with little modification to conventional hardware.

Explanation of a First Preferred Embodiment

Figure 10:
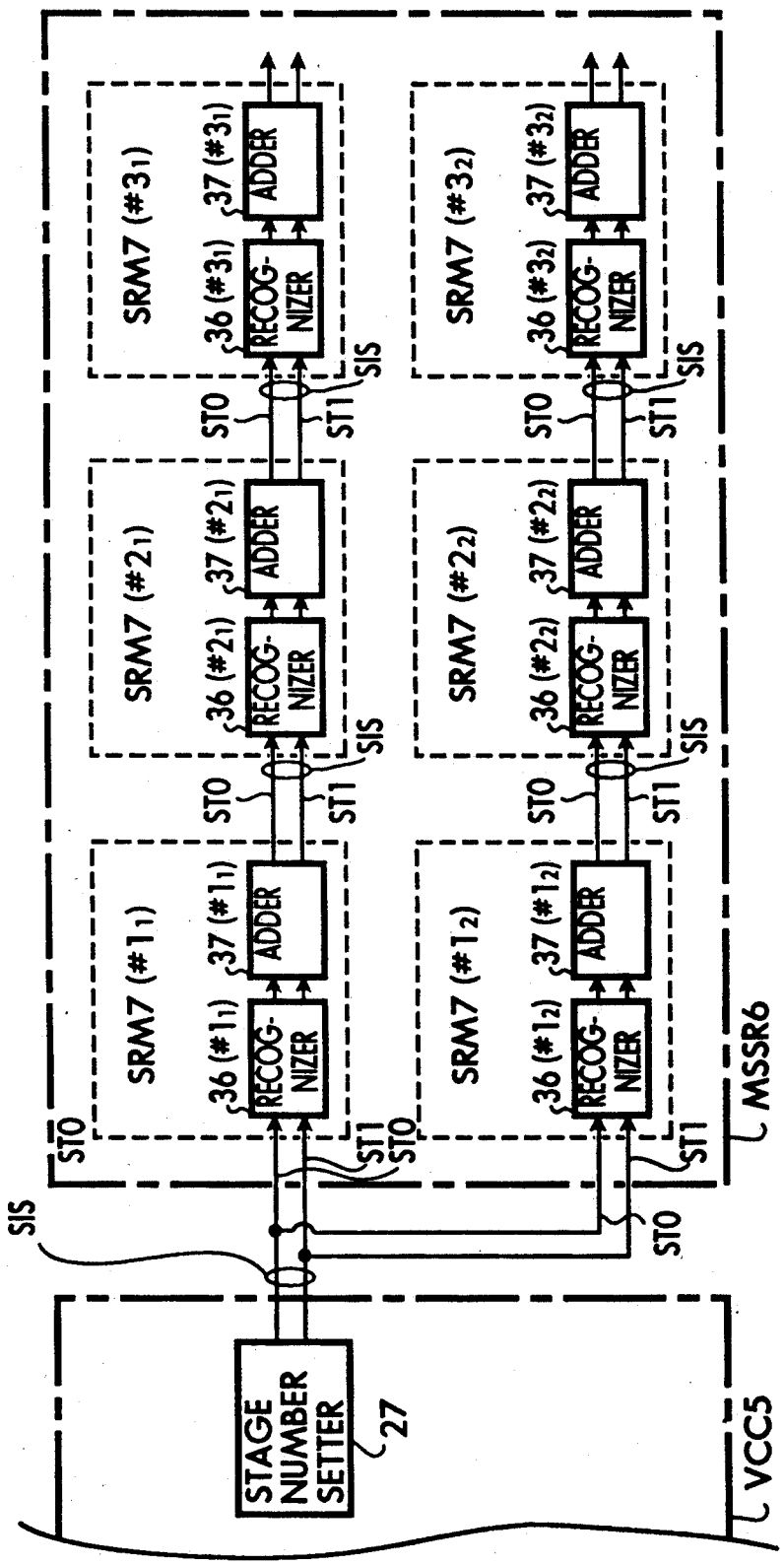
FIG. 10 is a block diagram of a first preferred embodiment of this invention.

FIG. 10 is a block diagram illustrating only the parts pertinent to a first embodiment of this invention. The first embodiment is basically configured the same as the generic ATM switching system shown in FIG. 1.

Figure 1:
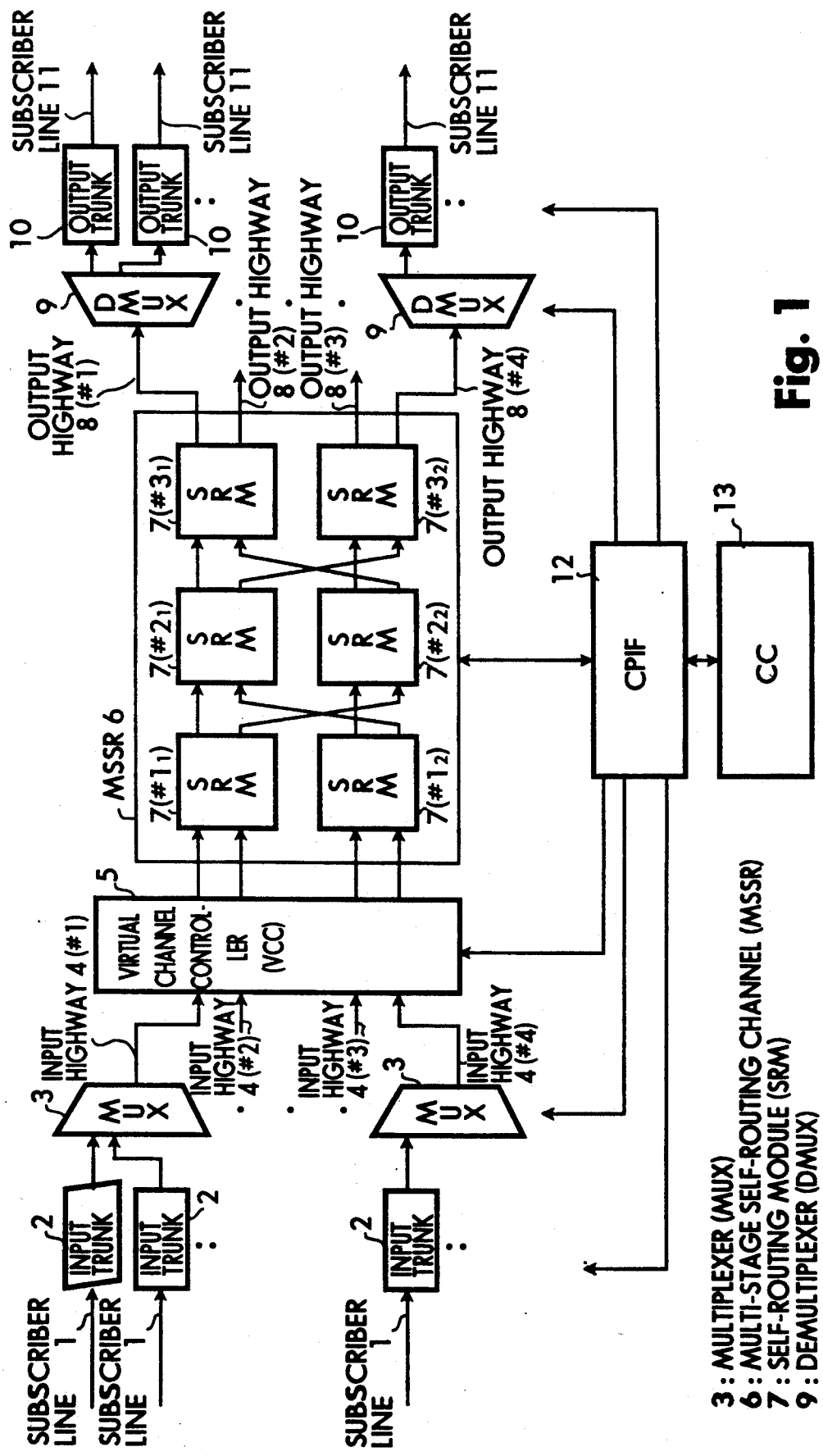
FIG. 1 is a schematic view of a generic ATM switching system.

In FIG. 10, a stage number setting line SIS for connecting a stage number setter 38 set in the VCC 5 with a recognizer 36 set in the SRM 7 as well as an adder 37 in the SRM 7 of each stage with the recognizer 34 set in the SRM 7 of the succeeding stage is provided separately from the ATM transmission path shown in FIG. 1. However, in reality, it can be substituted by an unused line of the cable forming the ATM transmission path.

The stage number setter 38 shown in FIG. 10 outputs two (2) kinds of stage number setting signals ST0 and ST1 to the stage number setting lines SIS formed by two (2) physical wires. The stage number setter 38 has a simple configuration in which e.g. two (2) lines of stage number setting lines SIS are both earthed for outputting low level voltage signals as stage number setting signals ST1 and ST0. They are generally two (2) bit digital signals having value 0.

Figure 2:
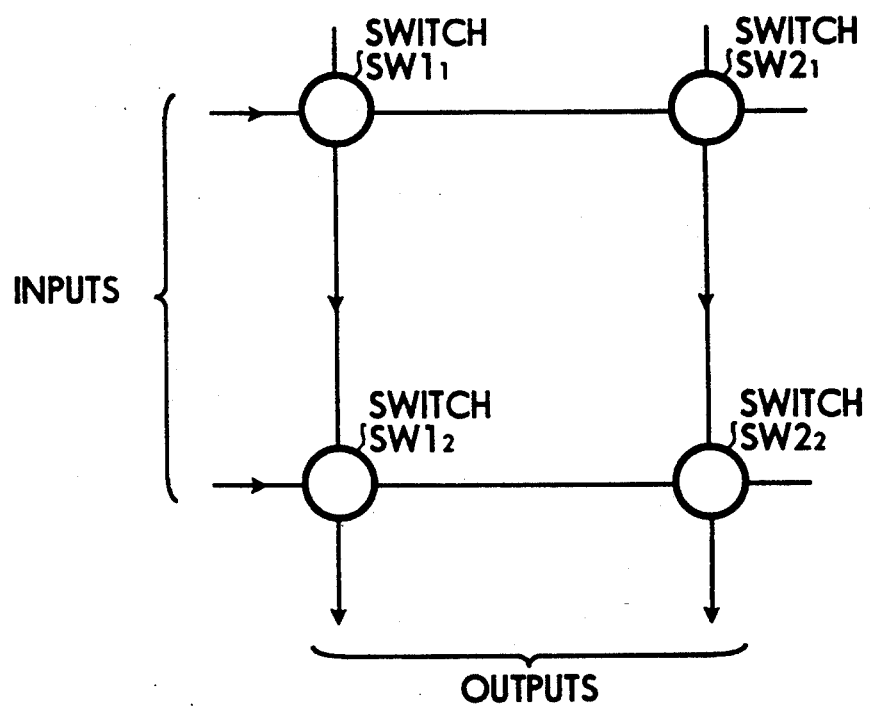
FIG. 2 shows an exemplary configuration of one of the SRMs 7 shown in FIG. 1.

The stage number setting lines SIS transmit outputs from the stage number setter 38 to either $\#1_1$ of the recognizers 36 in $\#1_1$ of the SRMs 7 or $\#1_2$ of the recognizers 36 in $\#1_2$ of the SRMs 7 in the first stage of the MSSR 6. Either one of these recognizers 36 ($\#1_1$ or $\#1_2$) recognizes that the stage number of its own one of the SRMs 7 ($\#1_1$ or $\#1_2$) is 1 by recognizing that stage number setting signals ST1 and ST0 both have a logical value "00". Thus, either one of these recognizers 36 ($\#1_1$ or $\#1_2$) sets information about stage number 1 to registers (not shown) in the header checkers 14 of the four (4) switches SW1$_1$ through SW2$_2$ (Refer to FIG. 2.) in its own one of the SRMs 7 ($\#1_1$ or $\#1_2$).

Next, by adding a logical value "1" to stage number setting signals ST1 and ST0 indicating the logical value "00", the adder 37 ($\#1_1$ or $\#1_2$) changes stage number setting signals ST1 and ST0 to indicate logical value "01", which the stage number setting lines SIS transmit to one of the SRMs 7 ($\#2_1$ or $\#2_2$) in the second stage.

The recognizer 36 ($\#2_1$ or $\#2_2$) in the SRM 7 ($\#2_1$ or $\#2_2$) of the second stage recognizes that the stage number of its own one of the SRMs 7 ($\#2_1$ or $\#2_2$) is 2 by recognizing that stage number setting signals ST1 and ST0 both have a logical value "01". Thus, either one of these recognizers 36 ($\#2_1$ or $\#2_2$) sets information about stage number 2 to registers (not shown) in the header checkers 14 of the four (4) switches SW1$_1$ through SW2$_2$ in its own one of the SRMs 7 ($\#2_1$ or $\#2_2$).

Next, by adding a logical value "1" to stage number setting signals ST1 and ST0 indicating the logical value "01", the adder 37 ($\#2_1$ or $\#2_2$) changes stages number setting signals ST1 and ST0 to indicate logical value "10", which the stage number setting lines SIS transmit to one of the SRMs 7 ($\#3_1$ or $\#3_2$) in the second stage.

The recognizer 36 ($\#3_1$ or $\#3_2$) in the SRM 7 ($\#3_1$ or $\#3_2$) of the third stage recognizes that the stage number of its own one of the SRMs 7 ($\#3_1$ or $\#3_2$) is 3 by recognizing stage number setting signals ST1 and ST0 both have a logical value "10". Thus, either one of these recognizers 36 ($\#3_1$ or $\#3_2$) sets information about stage number 3 to registers (not shown) in the header checkers 14 of the four (4) switches SW1$_1$ through SW2$_2$ (Refer to FIG. 2.) in its own one of the SRMs 7 ($\#3_1$ or $\#3_2$).

Figure 5:
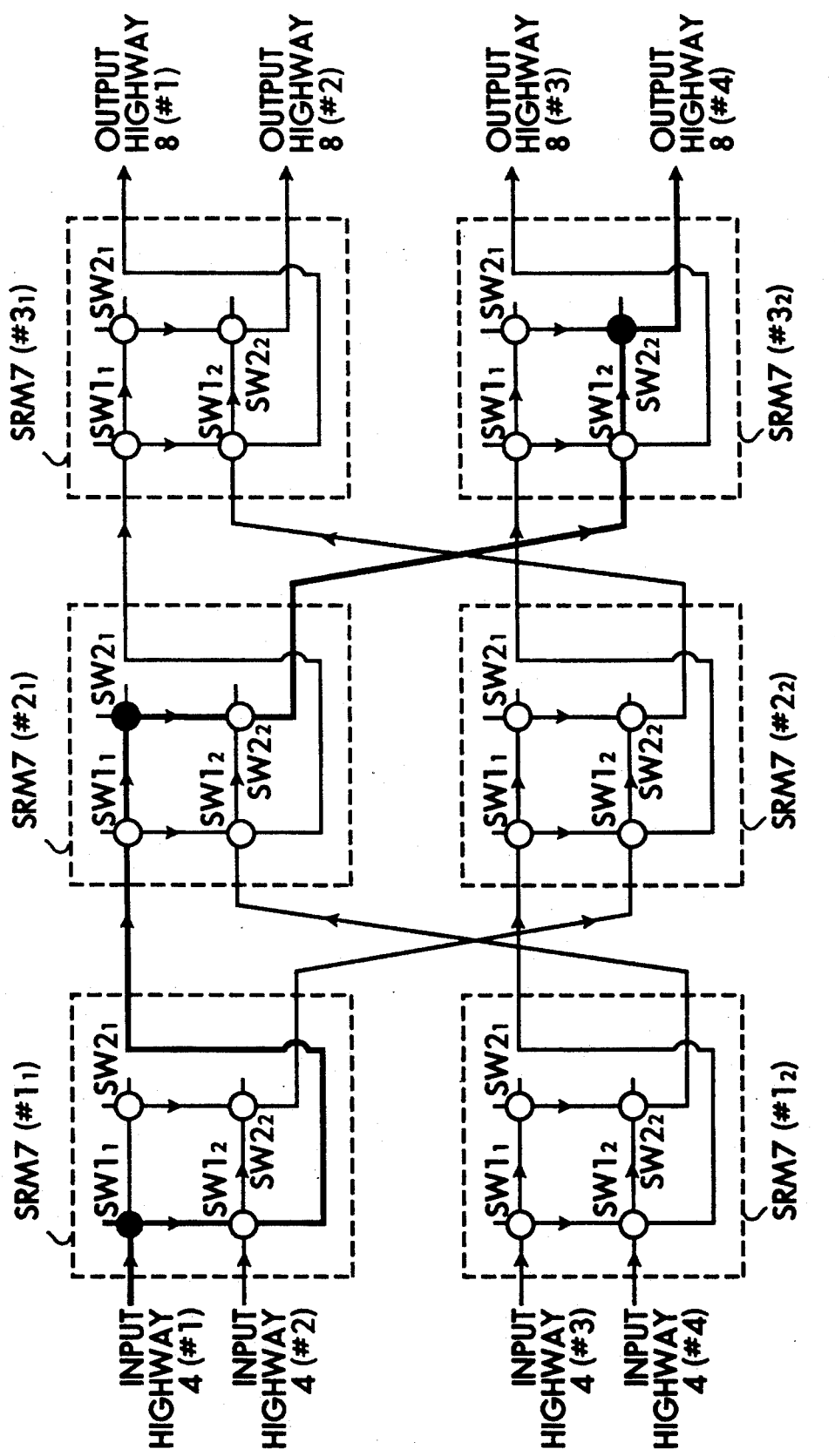
FIG. 5 shows a relation between tag data and a transmission path.
Figure 6:
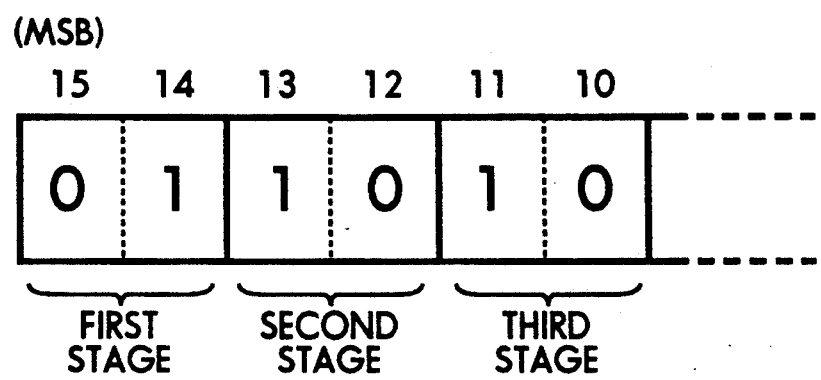
FIG. 6 shows an exemplary configuration of tag data.
Figure 8:
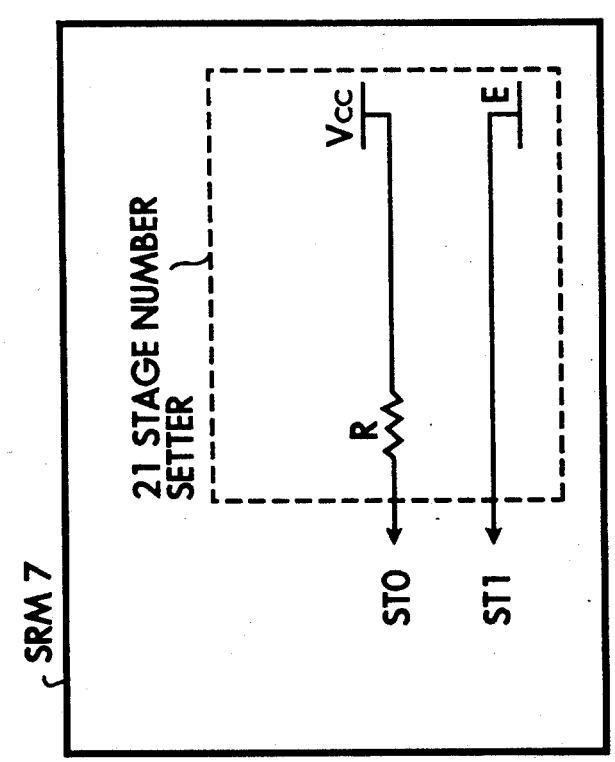
FIG. 8 shows a second prior art configuration for setting stage numbers in the respective SRMs 7 shown in FIG. 1.
Figure 7:
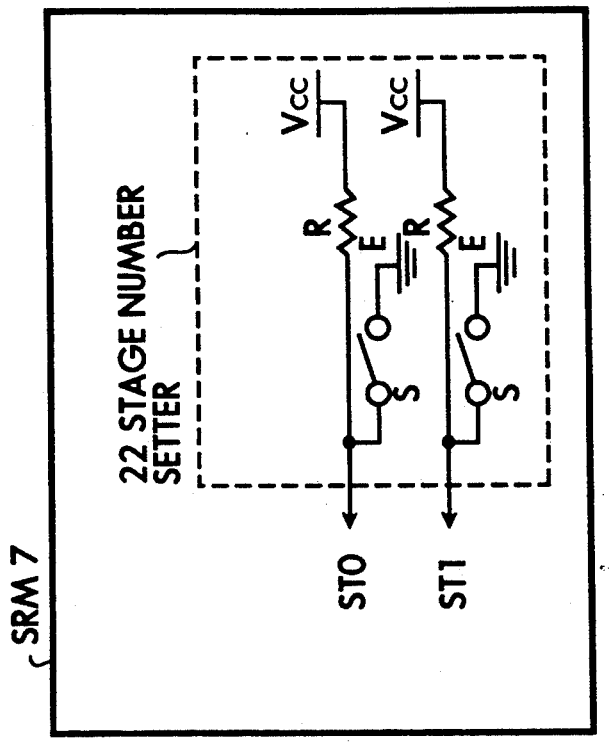
FIG. 7 shows a first prior art configuration for setting stage numbers to the respective SRMs 7 shown in FIG. 1.

Thus, stage number setting signals ST1 and ST0 autonomously set stage numbers in SRMs 7 in respective stages. Thence, the switching operations shown in FIGS. 5 and 6 are realized.

Explanation of a Second Preferred Embodiment

A second preferred embodiment of this invention is explained below. The second embodiment is basically configured the same as the generic ATM switching system shown in FIG. 1. However, its features reside in the switches SW1$_1$ through SW2$_2$ in the SRMs 7 and the VCC 5.

Figure 11A:
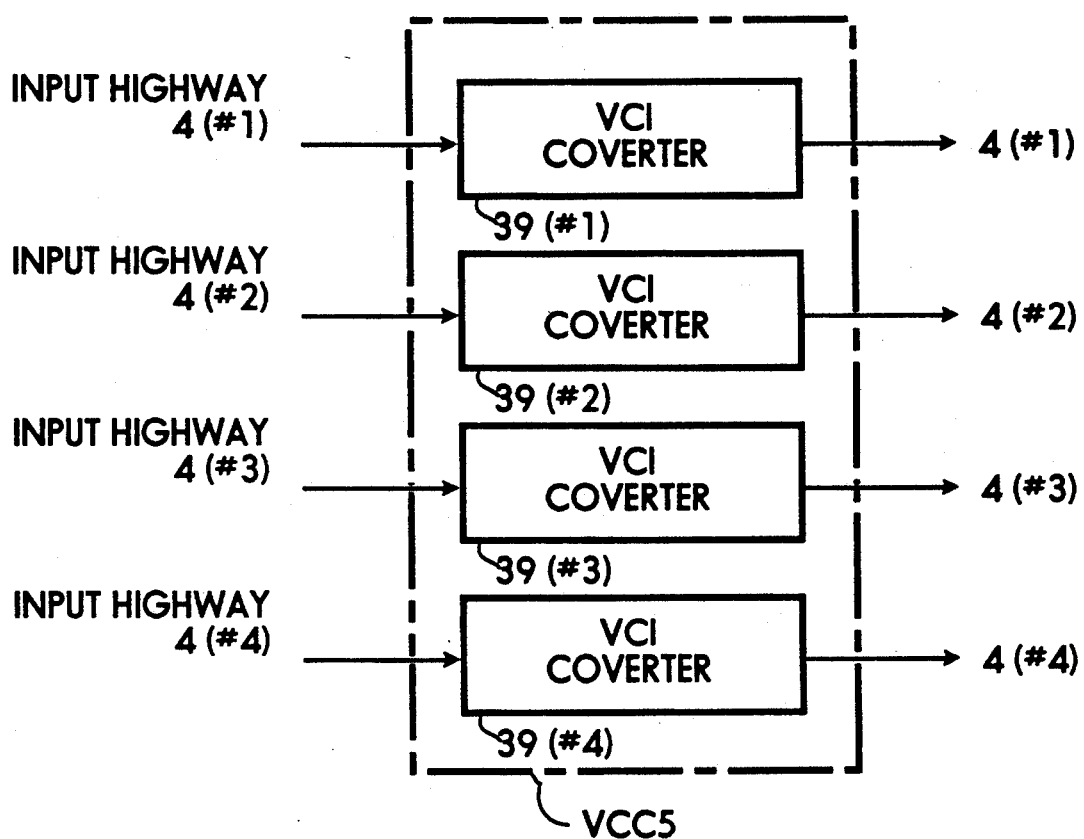
FIG. 11A is a block diagram of a VCC 5 for use in a second preferred embodiment of this invention.
Figure 11B:
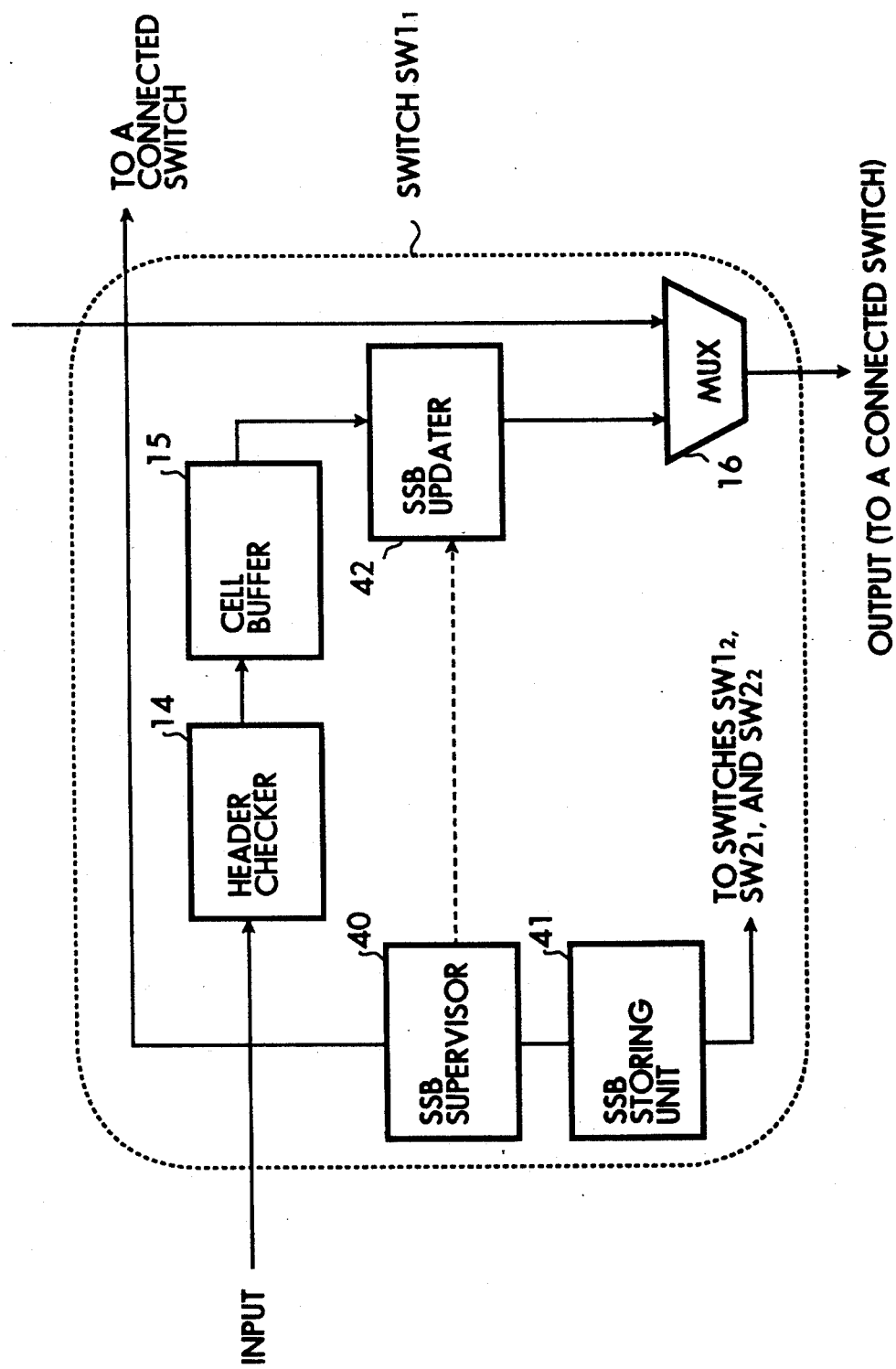
FIG. 11B is a block diagram of an $SW1_1$ for use in a second preferred embodiment of this invention.
Figure 12:
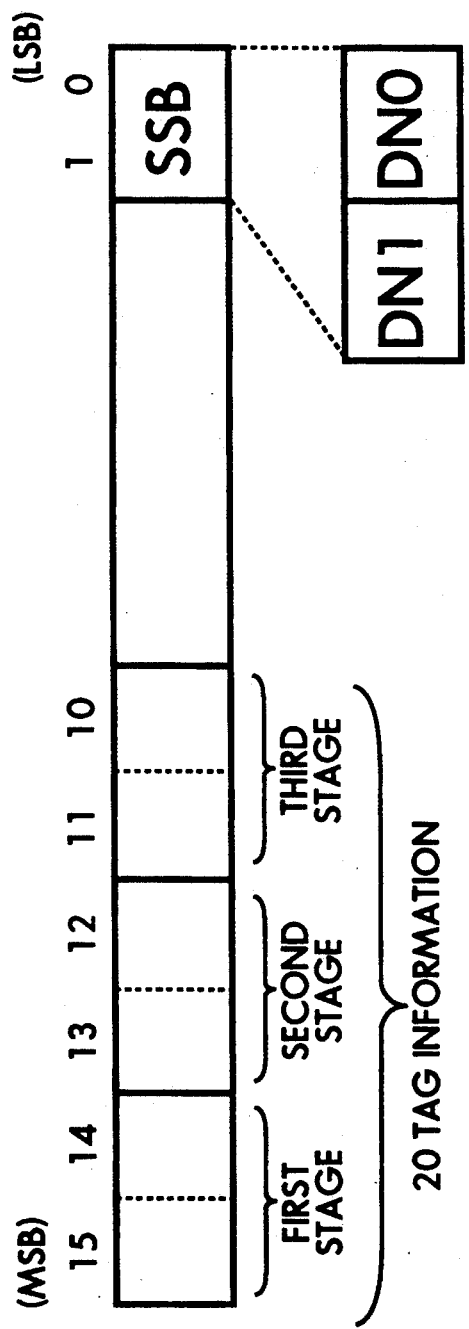
FIG. 12 shows the configuration of a tag part for use in a second preferred embodiment of this invention.

FIG. 11A is a block diagram of a VCC 5 for use in the second preferred embodiment of this invention. FIG. 11B is a block diagram of an SW1$_1$ for use in the second preferred embodiment of this invention. FIG. 12 shows the configuration of a tag part for use in the second preferred embodiment of this invention.

Figure 4A:
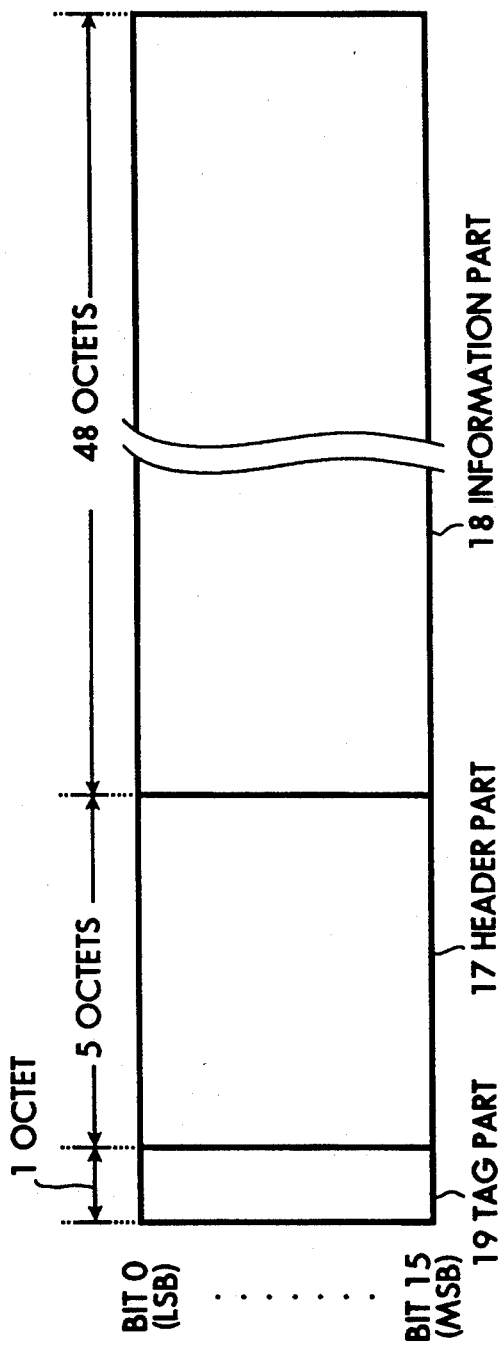
FIG. 4A shows the data configuration of the ATM cells handled by the ATM switching system shown in FIG. 1.
Figure 4B:
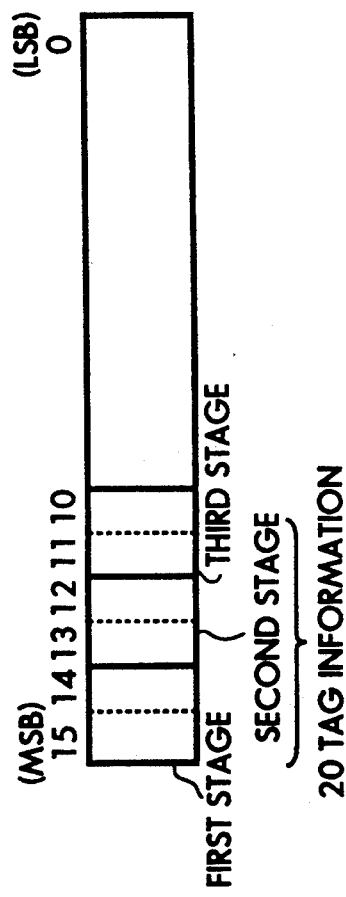
FIG. 4B shows the configuration of the tag part 19 shown in FIG. 4A.

In FIG. 11A, a VCC 5 comprises #1 through #4 of VCI converters 39 provided respectively to #1 through #4 of input highways 4. Ordinarily, respective VCI converters 39 change VCIs specifying the destination information attached to the headers of the supplied ATM cells to VCIs specifying the next output node (ATM switching system). The respective VCI converters 39 attach to the ATM cells tag parts 19 including tag data 20 indicating how the supplied ATM cells are switched, i.e. by which one of the switches SW1$_1$ through SW2$_2$ in which one of the SRMs 7 in the MSSR 6, to be outputted to the targeted one of the output highways 8. (Refer to FIG. 4A.)

The second preferred embodiment of this invention extends the above described tag attachment function of the VCI converters 39 described above. As shown in FIG. 12, the respective VCI converters 39 use, as stage number setting bits SSB, certain ones of the unused 10 least significant bits of the tag part 19 (Refer to FIG. 4A.) of respective ATM cells. The bit number of SSB needs to be enough to identify SRMs 7 in respective stages of the MSSR 6. Since SRMs 7 are arranged in three (3) stages in an example of a switching system similar to that shown in FIG. 1, the two (2) least significant bits of the tag part 19 are used. These bits are designated as DN0 and DN1. The value of the stage number setting bits SSB are set to "01" when stage numbers are set and "00" at all other times.

Figure 3:
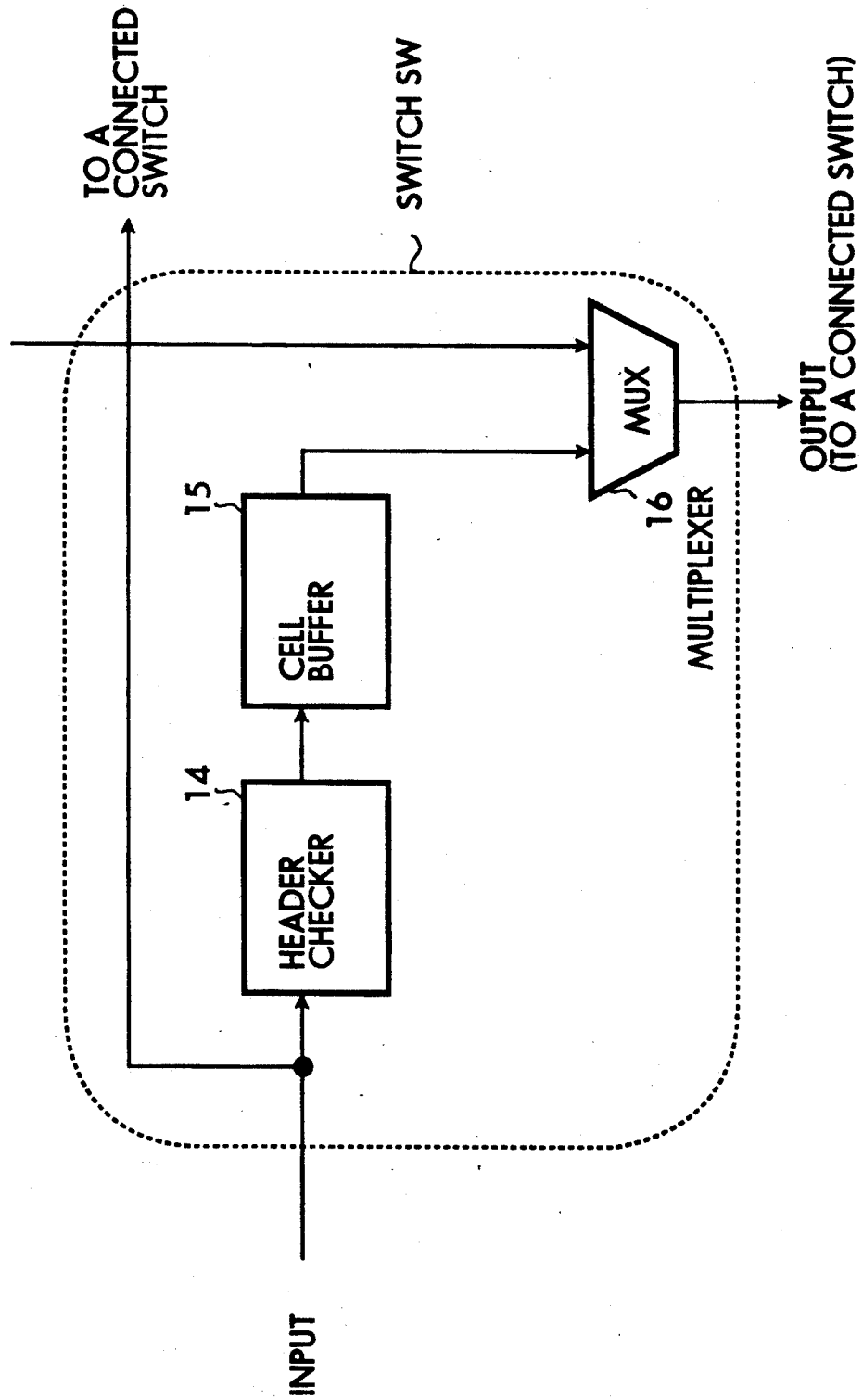
FIG. 3 shows the configuration of one of the above switches $SW1_1$ through $SW2_2$ in one of the SRMs 7.

Of switches SW1₁ through SW2₂ in respective SRMs 7 of the MSSR 6 shown in FIG. 1, switch SW1₁ (Refer to FIG. 2.) has a configuration such as that shown in FIG. 11B, which extends the configuration shown in FIG. 3.

Parts in FIG. 11B with the same numbers as those in FIG. 3 have the same functions.

The receiving part of switch SW1₁ comprises an SSB supervisor 40 for supervising the stage number setting bits SSB shown in FIG. 12 attached to the tag part 19 of an ATM cell. The SSB supervisor 40 constantly supervises the stage number setting bits SSB of the passing ATM cells, and stores the SSB value other than "00" in an SSB storing unit 41 when it detects a non-"00" SSB value. The SSB storing unit 41 is connected to three (3) other switches SW1₂, SW2₁ and SW2₂ (Refer to FIG. 2.) in the same SRM 7 than switch SW1₁ to which the SSB storing unit 41 belongs. This makes it possible to set a stage number corresponding to the value expressed by the stage number setting bits SSB in all switches SW1₁ through SW2₂ in the same SRM 7.

Further, the SSB supervisor 40 notifies an SSB updater 42 provided in the emitting part of the cell buffer 15 of a detection of the stage number setting bits SSB other than "00". This causes the SSB updater 42 to output the ATM cell to a multiplexer (MUX) 16 by incrementing the value of the stage number setting bits SSB by +1 of the ATM cell whose non-"00" value caused the SSB supervisor 40 to have the SSB storing unit 41 store the value.

Here, three (3) switches SW1₂, SW2₁ and SW2₂ (excepting switch SW1₁) in the same SRM 7 have the ordinary configuration shown in FIG. 3 and do not possess a function of supervising the stage number setting bits SSB.

Figure 13:
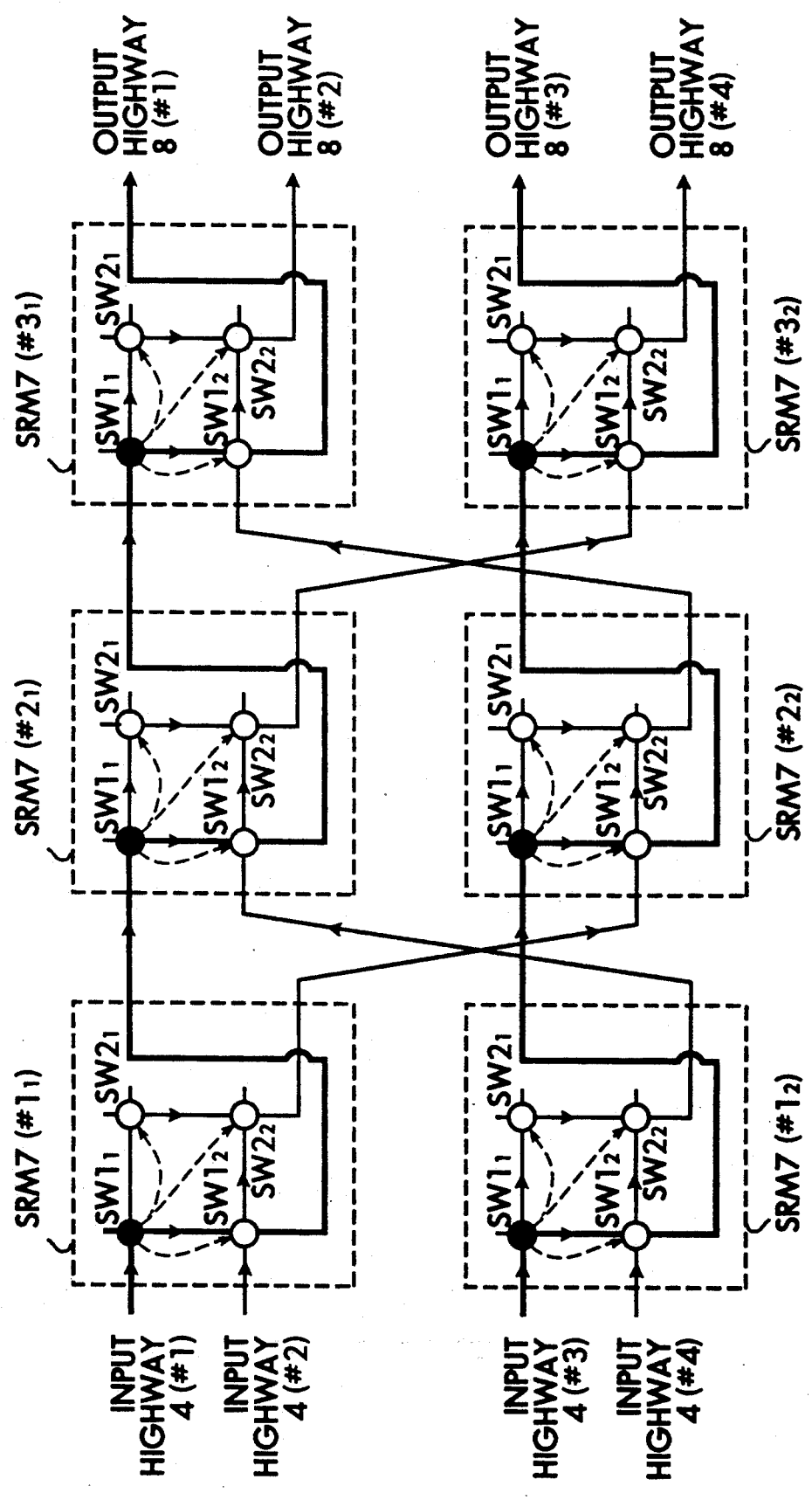
FIG. 13 illustrates operations of the second preferred embodiment.

FIG. 13 illustrates operations of the second preferred embodiment. More specifically, FIG. 13 explains the operations of the second preferred embodiment of this invention having the configuration shown in FIGS. 11A and 11B.

1 and #3 of VCI converters 39 shown in FIG. 11A output ATM cells whose tag part has "01" as the stage number setting bits SSB respectively to #1 and #3 of the input highways 4. The ATM cells are inserted at the empty cell timings of the respective input highways 4. ATM cells thus outputted to #1 and #3 of the input highways 4 flow through the path, shown as bold lines in FIG. 13, connected to #1 and #3 of the output highways 4. Since the operations of the paths from #1 and #3 are the same, only the path from #1 is explained below.

ATM cells for setting stage numbers transmitted over #1 of the input highways 4 are supplied to #1₁ of SRMs 7 in the first stage. The SSB supervisor 40 (Refer to FIG. 11B.) in switch SW1₁ detects that the stage number setting bits SSB have a non-"00" value "01". This causes the respective header checkers 14 (FIG. 11B or 3) of all switches SW1₁ through SW2₂ in #1₁ of SRMs 7 in the first stage to store stage number 1, as illustrated by the dashed arrows in FIG. 13.

The SSB supervisor 40 notifies the header checker 14 (FIG. 11B) of the above described detection by a control line (not shown). This causes the header checker 14 to unconditionally buffer the above described ATM cells for setting stage numbers in the cell buffer 15 (FIG. 11B). The ATM cells thus stored are outputted to output side highways at predetermined output timings.

As shown in FIG. 13, the ATM cells thus outputted from switch SW1₁ of #1₁ of the SRMs 7 in the first stage pass through the multiplexer (MUX) 16 (Refer to FIG. 3.) in switch SW1₂ of #1₁ of the SRMs 7 to be supplied to #2₁ of the SRMs 7 in the second stage.

Then, the SSB supervisor 40 (Refer to FIG. 11B.) in the switch SW1₁ in #2₁ of the SRMs 7 in the second stage detects that the stage number setting bits SSB are non-"00" value "10", which the SSB storing unit 41 stores. This sets stage number 2 to all switches SW1₁ through SW2₂ in #2₁ of the SRMs 7 in the second stage. After the cell buffer 15 buffers the ATM cells, the SSB updater 42 adds "1" to the value "10" of the stage number setting bits SSB. The ATM cells with new stage number setting bits SSB having the value "11" are sent from switch SW1₁ through switch SW1₂ to #3₁ of the SRMs 7 in the third stage.

Further, the SSB supervisor 40 (Refer to FIG. 11B.) of switch SW1₁ in #3₁ of the SRMs 7 in the third stage detects that the stage number setting bits SSB have non-"00" value "11", which is stored in the SSB storing unit 41. Thus, similar to the case of the first stage, stage number 3 is assigned to all switches SW1₁ through SW2₂ in #3₁ of the SRMs 7 in the third stage.

As described above, ATM cells set stage numbers in the respective stages of the SRMs 7 autonomously, and thereafter realize switching operations similar to those illustrated in FIGS. 5 and 6.

What is claimed is:

1. A switch stage number setting apparatus for a MSSR channel, being for setting stage numbers, which identify respective stages, to self-routing modules arrayed in respective stages of a channel operating in a multi-stage self-routing system; said switch stage number setting apparatus for an MSSR channel comprising:

recognizing means provided in self-routing modules, each of said recognizing means being for setting a stage number to the switches in the self-routing module of its own stage by recognizing a stage number setting signal supplied from a self-routing module in the preceding stage;

updating means provided in self-routing modules, each of said updating means being for updating a stage number setting signal supplied from a self-routing module in the preceding stage and outputting it to a self-routing module in the succeeding stage; and a stage number setting means for outputting a predetermined stage number setting signal to a self-routing module in the first stage of said channel.

2. The switch stage number setting apparatus for an MSSR channel according to claim 1, wherein:

said stage number setting signals comprise signals capable of counting the value of stage numbers of said self-routing modules in said channel;

said stage number setting means outputs, as said stage number setting signals, signals capable of expressing the value corresponding to the stage number of a self-routing module in the first stage of said channel;

said updating means provided in said self-routing modules output to a self-routing module in the succeeding stage a stage number setting signal expressing the value incremented by +1 to the value expressed by said stage number setting signal supplied from a self-routing module in the preceding stage.

3. The switch stage number setting apparatus for a MSSR channel according to claim 2, wherein:
said stage number setting means outputs a signal having a logical value "0" as said stage number setting signal.

4. The switch stage number setting apparatus for a MSSR channel according to claim 1, wherein:
said stage number setting means is provided in a virtual channel controller connected before said channel.

5. The switch stage number setting apparatus for a MSSR channel according to claim 4, wherein:
said stage number setting signals are transmitted over a stage number setting line, different from transmission paths for transmitting communication information, connecting said virtual controller to respective ones of said self-routing modules in said channel.

6. A switch stage number setting apparatus for an MSSR channel, for setting stage number which identify respective stages including first, preceding and next stages to self-routing modules arrayed in the respective stages in a channel operating in a multi-stage self-routing system, said self-routing modules having respective switching means, said switch stage number setting apparatus for the MSSR channel comprising:
receiving means provided in each of the self-routing modules, each of said receiving means for switching, for acceptance, a cell having stage number setting information supplied from one of the self-routing modules in the preceding stage, and for setting a stage number to the respective switching means in a second of the self-routing modules by recognizing said stage number setting information attached to said cell switched for acceptance;
updating means provided in each of said self-routing modules, each of said updating means for updating the stage number setting information as updated stage number setting information of said cell switched by said receiving means for acceptance, and for outputting to a third of the self-routing modules in the next stage said cell to which the updated stage number setting information is attached;
cell emitting means for emitting an emitted cell having predetermined stage number setting information to a fourth of the self-routing modules in the first stage of said channel.

7. The switch stage number setting apparatus for an MSSR channel according to claim 6, wherein:
said stage number setting information comprises data capable of counting the value of stage numbers of said self-routing modules in said channel;
said cell emitting means outputs a cell having data, as said stage number setting information, capable of expressing the value corresponding to the stage number of a self-routing module in the first stage of said channel; and
said updating means provided in said self-routing modules output to a self-routing module in the succeeding stage number setting information expressing the value incremented by +1 to the value expressed by said stage number setting information supplied from a self-routing module in the preceding stage.

8. The switch stage number setting apparatus for an MSSR channel according to claim 7, wherein:
said cell emitting means outputs a cell having a logical value "0" as said stage number setting information.

9. The switch stage number setting apparatus for an MSSR channel according to claim 6, wherein:
said receiving means and said updating means are provided in one of the switching means in each of said self-routing modules.

10. The switch stage number setting apparatus for an MSSR channel according to claim 6, further comprising a virtual channel controller including said cell emitting means, connected to said channel and outputting the emitted cell to said channel.

11. The switch stage number setting apparatus for an MSSR channel according to claim 10, wherein:
said emitted cell includes a tag part; and
said stage number setting information is attached to the tag part of said emitted cell output from said cell emitting means.

12. The switch stage number setting apparatus for an MSSR channel according to claim 11, wherein:
said respective stages further includes a succeeding stage;
said receiving means comprises a cell buffer storing said stage number setting information in the tag part of said emitted cell among the cell supplied from the one of the self-routing modules in the preceding stage, and set in the respective switching means in the second of the self-routing modules a value corresponding to said stage number setting information of said cell switched for acceptance; and
said updating means updates said stage number setting information of said cell switched by said receiving means for acceptance, and outputs to a fifth of the self-routing modules in the succeeding stage said emitted having the tag part which said updated stage number setting information is reattached.

* * * * *

UNITED STATES PATENT AND TRADEMARK OFFICE
CERTIFICATE OF CORRECTION

PATENT NO. : 5,191,577
DATED : March 2, 1993
INVENTOR(S) : Uchida et al.

It is certified that error appears in the above-indentified patent and that said Letters Patent is hereby corrected as shown below:

```
Col. 10, line 8, change "stages" to --stage--.
Col. 13, line 20, change "number" to --numbers--.
```

Signed and Sealed this

Twenty-first Day of December, 1993

Attest:

BRUCE LEHMAN

*Attesting Officer*    *Commissioner of Patents and Trademarks*